June 15, 1965  E. J. GNIECH  3,189,383
RECLINING SEAT CONSTRUCTION
Filed Oct. 3, 1963  3 Sheets-Sheet 2
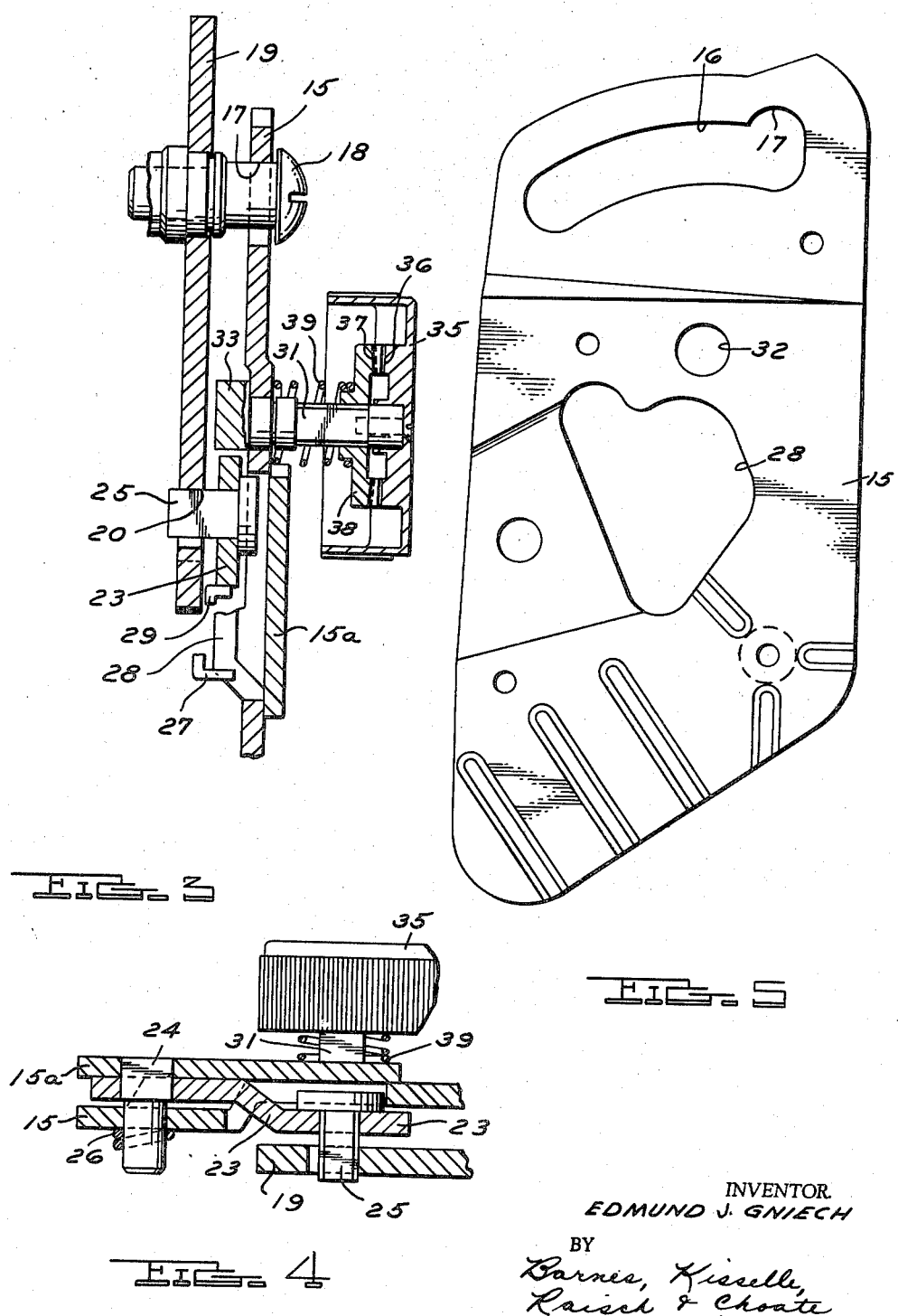
INVENTOR.
EDMUND J. GNIECH
BY
Barnes, Kisselle,
Raisch & Choate
ATTORNEYS June 15, 1965  E. J. GNIECH  3,189,383
RECLINING SEAT CONSTRUCTION
Filed Oct. 3, 1963  3 Sheets-Sheet 3
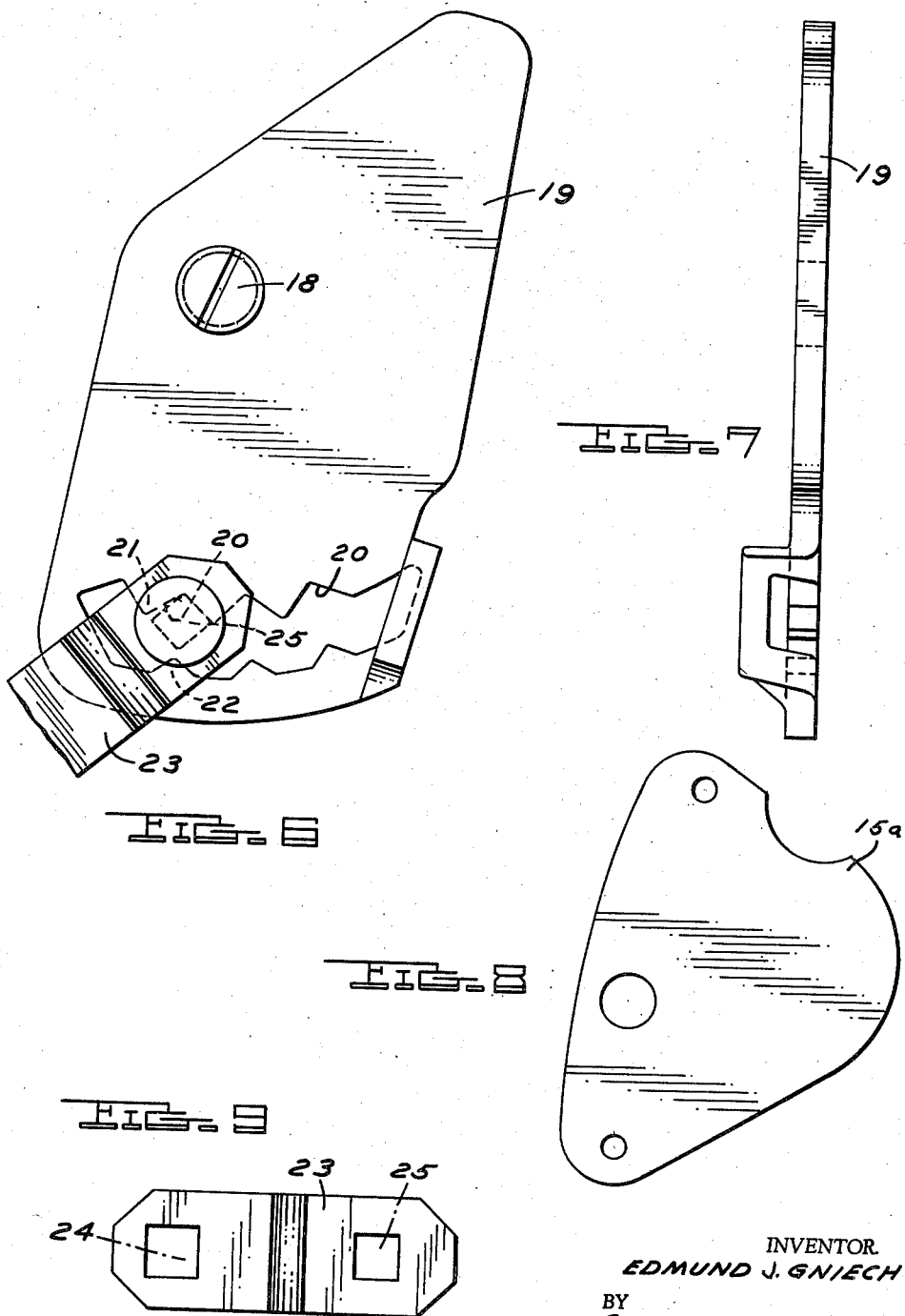
INVENTOR.
EDMUND J. GNIECH
BY
Barnes, Kisselle,
Raisch & Choate
ATTORNEYS

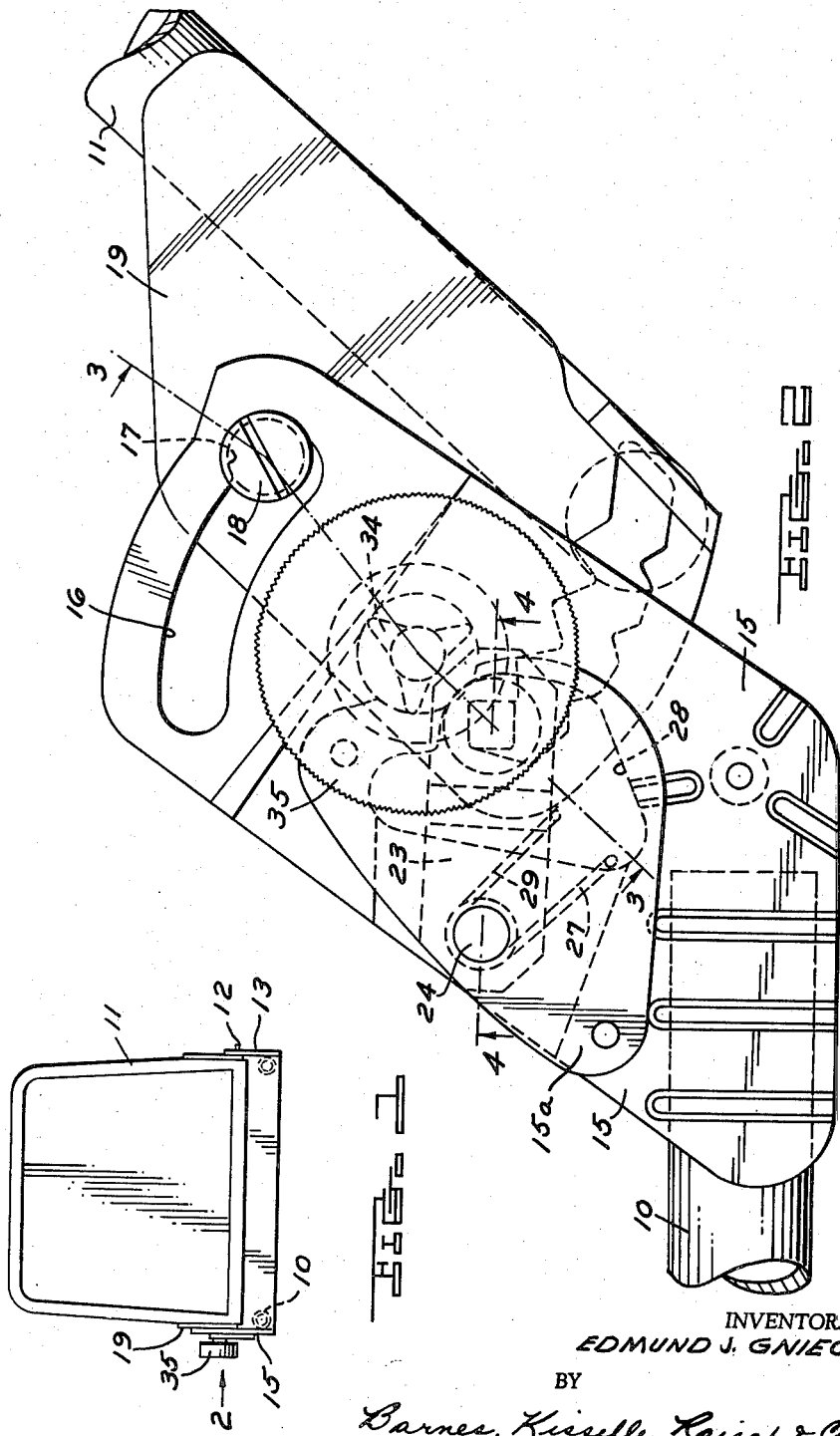

3,189,383
RECLINING SEAT CONSTRUCTION

Edmund J. Gniech, Detroit, Mich., assignor to Young Spring & Wire Corporation, Detroit, Mich., a corporation of Michigan
Filed Oct. 3, 1963, Ser. No. 313,585
8 Claims. (Cl. 297—365)

This invention relates to reclining seats and particularly to reclining seats for automotive vehicles.

It is an object of the invention to provide reclining seat construction wherein the seat can be moved from a generally upright to a reclining position; wherein the seat can be also moved from a generally upright position to a forward folded position so that it can be adapted to a two-door automobile to provide ready access to the rear seat; which is relatively simple; which utilizes a minimum number of parts; and which can be manufactured at low cost.

In the drawings:

FIG. 1 is a rear elevational view of a seat embodying the invention.

FIG. 2 is a fragmentary side elevational view taken in the direction of the arrow 2 in FIG. 1.

FIG. 3 is a fragmentary sectional view taken along the line 3—3 in FIG. 2.

FIG. 4 is a fragmentary sectional view taken along the line 4—4 in FIG. 2.

FIG. 5 is a side view of the seat base hinge plate.

FIG. 6 is a side view of the seat back hinge plate.

FIG. 7 is an end elevation of the plate shown in FIG. 6.

FIG. 8 is a side view of an end plate utilized in the invention.

FIG. 9 is a plan view of a swinging arm utilized in the invention.

Referring to FIG. 1, the invention relates to a seat embodying a seat base 10 on which the seat cushion is supported and a seat back 11 on which the back cushion is supported. In accordance with the invention, the seat is made to be utilized particularly with a two-door automobile wherein the seat back is divided into two portions, each of which is adapted to be folded forwardly to permit access to the rear seat of the automobile. As shown in FIG. 1, each seat back 11 comprises a tubular frame which is hinged at its inner end by a pin 12 extending into a hole in a bracket 13.

At its outer end, the frame 11 is hinged to the base by the reclining seat mechanism presently described. As shown in FIG. 2, a base hinge plate 15 is welded to the tubular frame of the base 10 and extends generally vertically upwardly. Base plate 15 is provided with a generally horizontally extending slot 16 adjacent its upper end, the ends of which are curved downwardly. A notch 17 is provided at the rear end of the slot 16 and is engaged by a pin 18 fixed on a seat back hinge plate 19 which is welded to the side of the tubular seat back 11. The engagement of the pin 18 with the notch 17 serves as a hinge, as presently described, during the positioning of the seat back 11 in any one of the upright or rearwardly reclined positions.

As further shown in FIGS. 2 and 6, back hinge plate 19 is formed with an arcuate slot 20 which has a center of curvature at the axis of pin 18. Teeth 21, 22 are formed along the side edges of slot 20. The teeth 21, 22 are generally right angular, that is, the included angle formed by the sides of the teeth is approximately 90°.

As shown in FIGS. 2 and 4, an arm 23 is hinged on a pin 24 fixed on the base hinge plate 15. Arm 23 is adapted to swing upwardly and downwardly. A stop 25, which is generally square in cross section, is fixed on the arm 23 and is adapted to engage the teeth 21, 22. The arm 23 and, in turn, the base plate 19 and back 11 are yieldingly urged upwardly by a spring 26 that is wound around the pin 24 and has one leg 27 thereof engaging an opening 28 in the base plate 15 and the other leg 29 thereof engaging the lower edge of the arm 23. By this arrangement, the stop pin 25 is yieldingly urged upwardly into engagement with the teeth 21 and the plate 19 is, in turn, yieldingly urged upwardly to hold the pin 18 in engagement with the notch 17 of the slot 16. A cover plate 15a, riveted to plate 15, overlies opening 28.

As shown in FIG. 3, a shaft 31 is rotatably mounted in the base plate 15 in opening 32 and a star-shaped member 33 is mounted on one end thereof. Member 33 has radially extending projections 34. The shaft 31 and, in turn, the member 33 are adapted to be rotated, counterclockwise as shown in FIG. 2, and as they are rotated, projections 34 are successively brought into engagement with the arm 23 to periodically swing the arm 23 downwardly and, in turn, move the stop 25 out of engagement with teeth 21. As shown in FIG. 6, the teeth 21, 22 are alternately disposed so that when the arm 23 is swung downwardly the stop 25 can be moved out of engagement with a tooth 21 and into engagement with a tooth 22. As a projection 34 moves past the end of arm 23, the spring will then urge arm 23 upwardly into engagement with a successive tooth 21. Thus, the seat back moves successively rearwardly because of its own weight. In the poistion shown in FIG. 2, the back 11 is in generally upright position relative to the base.

In order to rotate the shaft 31, a knob 35 is rotatably mounted on the end of the shaft 31 and is formed with ratchet teeth 36 that engage complementary teeth 37 on a member 38 keyed on the shaft 31 and yieldingly urged by spring 39 into engagement with the teeth 36. The teeth 36, 37 form a one-way clutch so that when the knob 35 is rotated in one direction, counterclockwise as viewed in FIG. 2, the shaft 31 and, in turn, the member 33 is rotated whereas when the knob 35 is rotated in the opposite direction, no rotation of the shaft 33 occurs. In this manner, the knob 35 is adapted to move the stop 25 downwardly in order to permit the seat to move by its own weight to a rearward inclined position.

In order to raise the seat, the seat back 11 is grasped manually and moved forwardly causing the stop 25 to successively move back and forth between the teeth 21, 22 until the seat back 11 is raised to its upright position.

In order to permit the folding of the seat and thereby permit access to the rear of a two-door automobile, the seat back 11 is manually pushed downwardly to disengage the pin 18 from the notch 17 which will then permit the seat back 11 to be swung forwardly, the pin 18 moving along the slot 16 to guide the forward folding action.

It can thus be seen that there has been provided a reclining seat construction wherein the seat back can be readily moved from an upright position to successive rearward reclining positions and also to a forward folding position to permit access to the rear of a two-door automobile. The reclining seat construction is simple, utilizes a minimum number of parts, and is relatively inexpensive.

I claim:
1. In a reclining seat, the combination comprising
   a seat base,
   a seat back,
   means for pivoting said back to said base for movement from generally upright position to a rearward reclining position,
   means defining two rows of teeth on said base in closely spaced relation to said pivot,
   an arm pivoted for swinging movement on said base, a stop member on said arm adapted to move upwardly into engagement with said teeth, spring means yieldingly urging said arm and, in turn, said stop member into engagement with one row of said teeth, a knob rotatably mounted on said base, a member rotatably mounted and adapted to be operated by rotation of said knob, said rotatable member having a plurality of circumferentially spaced projections thereon which are successively movable downwardly upon rotation of said member to periodically swing said arm downwardly and, in turn, said stop out of engagement with a tooth in said one row of said teeth into engagement with a tooth in said other row of teeth to permit said back to be moved angularly relative to said base.

2. The combination set forth in claim 1 including a one-way clutch interposed between said knob and said rotatable member.

3. The combination set forth in claim 1 wherein said teeth have an included angle of approximately 90°, said stop member being substantially square in cross section.

4. In a reclining seat, the combination comprising a seat base, a seat back, an arcuate slot on said base, a pin on said back adapted to slide in said slot, said slot having an upwardly extending portion at the rear end thereof adapted to be engaged by said pin to pivot said seat back on said base for swinging movement from a generally upright position to a reclining position, means defining two rows of teeth on said base in closely spaced relation to said pivot, an arm pivoted for swinging movement on said base, a stop member on said arm adapted to move upwardly into engagement with said teeth, spring means yieldingly urging said arm and, in turn, said stop member into engagement with one row of said teeth, a knob rotatably mounted on said base, a member rotatably mounted and adapted to be operated by rotation of said knob, said rotatable member having a plurality of circumferentially spaced projections thereon which are movable successively downwardly upon rotation of said member to periodically swing said arm downwardly and, in turn, said stop out of engagement with a tooth in one row of said teeth into engagement with a tooth in said other row of said teeth to permit said back to be moved under its own weight to successive inclined positions, said seat back being movable to a forwardly folded position from a generally upright position by manually moving said seat back and, in turn, said pin out of the notch in said slot and swinging said seat back forwardly thereby moving said pin forwardly in said slot in said base.

5. In a reclining seat, the combination comprising a seat base, a seat back, means for pivoting one end of said back to said base for movement from generally upright position to a rearward reclining position, a back hinge plate, a base hinge plate, said back hinge plate having a slot therein, two rows of teeth in closely spaced relation to said pivot on said back, an arm pivoted on said base hinge plate at a point spaced forwardly of said pivot of said back to said base for swinging movement, a stop member on said arm adapted to move upwardly into engagement with said teeth, spring means yieldingly urging said arm and, in turn, said stop member into engagement with one row of said teeth, a knob rotatably mounted on said base, a member rotatably mounted and adapted to be operated by rotation of said knob, said rotatable member having a plurality of circumferentially spaced radial projections thereon which are movable successively downwardly upon rotation of said member to periodically swing said arm downwardly and, in turn, said stop out of engagement with a tooth in one row of said teeth into engagement with a tooth in said other row of teeth to permit said back to be moved angularly relative to said base.

6. The combination set forth in claim 5 including a one-way clutch interposed between said knob and said rotatable member.

7. In a reclining seat, the combination comprising a seat base, a seat back, a base hinge plate on said base, a back hinge plate on said back, an arcuate slot on said base hinge plate, a pin on said back hinge plate adapted to slide in said slot, said slot having an upwardly extending portion at the rear end thereof adapted to be engaged by said pin to pivot said seat back on said base for swinging movement from a generally upright position to a reclining position, said back hinge plate having a slot therein, two rows of teeth formed along the side edges of said slot, an arm pivoted for swinging movement on said base hinge plate at a point forwardly of said slot in said base hinge plate, a stop member on said arm adapted to move upwardly into engagement with said teeth, spring means yieldingly urging said arm and, in turn, said stop member into engagement with one row of said teeth, a knob rotatably mounted on said base, a member rotatably mounted and adapted to be operated by rotation of said knob, said rotatable member having a plurality of radially circumferentially spaced projections thereon which are successively movable downwardly upon rotation of said member to periodically swing said arm downwardly and, in turn, said stop out of engagement with a tooth in said one row of teeth into engagement with a tooth in said other row of teeth to permit said back to move rearwardly under its own weight to successive reclining positions, said seat back being movable to a forwardly folded position from a generally upright position by manually moving said seat back and, in turn, said pin out of the notch in said slot and swinging said seat back forwardly thereby moving said pin forwardly in said slot in said base.

8. The combination set forth in claim 7 including a one-way clutch interposed between said knob and said rotatably mounted member.

No references cited.

FRANK B. SHERRY, *Primary Examiner.*